US011946167B2

(12) United States Patent
Francalanci et al.

(10) Patent No.: US 11,946,167 B2
(45) Date of Patent: Apr. 2, 2024

(54) HIGH-SPEED PROCESS FOR PRODUCING ACRYLIC FIBERS AND RELATIVE APPARATUS

(71) Applicant: Montefibre Mae Technologies S.r.l., Milan (IT)

(72) Inventors: Franco Francalanci, Uzzano (IT); Pierluigi Gozzo, Noale (IT); Ana Paula Vidigal, Lisbon (PT); Marco Rovellini, Piacenza (IT); Valter Guardiani, San Giorgio Piacentino (IT)

(73) Assignee: Montefibre Mae Technologies S.r.l., Milan (IT)

( * ) Notice: Subject to any disclaimer, the term of this patent is extended or adjusted under 35 U.S.C. 154(b) by 0 days.

(21) Appl. No.: 17/982,007

(22) Filed: Nov. 7, 2022

(65) Prior Publication Data

US 2023/0160108 A1 May 25, 2023

(30) Foreign Application Priority Data

Nov. 23, 2021 (IT) ........................ 102021000029576

(51) Int. Cl.
*B08B 3/14* (2006.01)
*B08B 3/04* (2006.01)
(Continued)

(52) U.S. Cl.
CPC ................ *D01F 6/38* (2013.01); *B08B 3/041* (2013.01); *B08B 3/048* (2013.01); *D01D 5/06* (2013.01); *D01D 10/00* (2013.01); *D01D 10/06* (2013.01); *D01D 11/00* (2013.01); *D01F 9/22* (2013.01); *D01H 13/02* (2013.01); *D10B 2321/10* (2013.01); *D10B 2401/063* (2013.01)

(58) Field of Classification Search
CPC ........... B08B 3/041; B08B 3/048; B08B 3/14; D01D 4/02; D01D 5/06; D01D 5/14; D01D 5/16; D01D 10/06; D01F 6/38; D06B 3/04; D06B 23/14; D06B 23/20
USPC ............ 264/178 F, 180, 181, 182, 184, 203, 264/210.8; 425/66, 67, 68, 71, 72.2, 377, 425/382.2, 464; 8/151.2; 68/181 R; 134/15, 34, 64 R, 84, 104.2, 110, 122 R
See application file for complete search history.

(56) References Cited

U.S. PATENT DOCUMENTS 2,743,994 A * 5/1956 Chaney ..................... D01F 6/38 264/182
3,965,227 A * 6/1976 Stoy .......................... D01F 6/38 264/182 X (Continued)

FOREIGN PATENT DOCUMENTS

CN 104 088 029 A 10/2014
GB 982 794 A 2/1965

(Continued)

OTHER PUBLICATIONS

Translation of JP-2009242984-A (published on Oct. 22, 2009).*
Oredana Guglielmetti, "Italian Search Report and Written Opinion of Italian Application No. IT 102021000014159," Italian Patent and Trademarks Office (UBIM), Rome, dated Jul. 20, 2022.

*Primary Examiner* — Leo B Tentoni
(74) *Attorney, Agent, or Firm* — Florek & Endres PLLC

(57) ABSTRACT

A process for the production of acrylic fibers, in particular a spinning process for obtaining precursor fibers of carbon fiber by the wet spinning of a polymer solution in an organic solvent and the relative apparatus.

17 Claims, 1 Drawing Sheet

(51) Int. Cl.

| | |
|---|---|
| ***D01D 4/02*** | (2006.01) |
| ***D01D 5/06*** | (2006.01) |
| ***D01D 5/14*** | (2006.01) |
| ***D01D 5/16*** | (2006.01) |
| ***D01D 10/00*** | (2006.01) |
| ***D01D 10/06*** | (2006.01) |
| ***D01D 11/00*** | (2006.01) |
| ***D01F 6/38*** | (2006.01) |
| ***D06B 3/04*** | (2006.01) |
| ***D06B 23/14*** | (2006.01) |
| ***D06B 23/20*** | (2006.01) |
| *D01F 9/22* | (2006.01) |
| *D01H 13/02* | (2006.01) |

(56) References Cited

U.S. PATENT DOCUMENTS

| | | | | |
|---|---|---|---|---|
| 2016/0186365 | A1 | 6/2016 | Taylor | |
| 2021/0285130 | A1 | 9/2021 | Guardiani et al. | |
| 2021/0381133 | A1* | 12/2021 | Nakamura | D01F 6/38 |

FOREIGN PATENT DOCUMENTS

| | | | | | |
|---|---|---|---|---|---|
| JP | 2009242984 | A | * | 10/2009 | D01D 5/06 |
| WO | WO-2020071445 | A1 | * | 4/2020 | D01F 6/38 |
| WO | 2020/171767 | A1 | | 8/2020 | |

* cited by examiner

HIGH-SPEED PROCESS FOR PRODUCING ACRYLIC FIBERS AND RELATIVE APPARATUS

FIELD OF THE INVENTION

The present invention relates to a process for the production of acrylic fibers, in particular a spinning process for obtaining precursor fibers of carbon fiber by the wet spinning of a polymer solution in an organic solvent and the relative apparatus.

BACKGROUND OF THE INVENTION

The present invention falls within the field relating to the production of acrylic fibers and carbon fiber precursors which provides for the preparation of polymers starting from acrylonitrile or copolymers mainly composed of acrylonitrile (90-99% by weight with respect to the total weight of the polymer) and one or more other comonomers in a quantity generally ranging from 1 to 10% by weight with respect to the total weight of the polymer.

The preferred co-monomers are both neutral vinyl molecules such as methyl acrylate, methyl methacrylate, vinyl acetate, acrylamide and analogues, and molecules bearing one or more acid groups such as acrylic acid, itaconic acid, sulfonated styrenes and analogues, or other co-monomers capable of imparting various chemical-physical characteristics to the material.

The polymers and copolymers thus prepared are then subjected to spinning to produce fibers that are collected in tows, suitable for being subsequently transformed into manufactured articles with different processing techniques, both for textile and technical use.

Carbon fiber "precursor" fibers are particular types of acrylic fiber: these are high-molecular-weight copolymers of acrylonitrile and one or more co-monomers, selected from those described above, in a quantity generally ranging from 1 to 5% by weight with respect to the total weight of the polymer. The carbon fibers are then obtained by means of a suitable thermal treatment of these "precursor" fibers based on polyacrylonitrile.

There are various industrial processes for the preparation of acrylic fibers, which use different polymerization and spinning methods.

With respect to the polymerization methods, the state of the art can be divided and schematized as follows:

A. Batch Processes (Two-Step).

In two-step batch processes, the polymer is generally produced in aqueous suspension, isolated and subsequently dissolved in a suitable solvent to be spun and transformed into fiber or precursor fiber in the case of carbon fiber. The solvents most commonly used for the preparation of the spinning solution are: dimethylacetamide (DMAC), dimethylformamide (DMF), dimethylsulfoxide (DMSO) and an aqueous solution of sodium thiocyanate (NaSCN).

B. Continuous Processes (One-Step)

In continuous processes, on the other hand, the polymerization takes place in a solvent and the solution thus obtained is directly used in spinning without the intermediate isolation of the polymer. The solvents most commonly used in these processes are: dimethylformamide (DMF), dimethylsulfoxide (DMSO), aqueous solution of zinc chloride ($ZnCl_2$) and aqueous solution of sodium thiocyanate (NaSCN).

Regardless of the process used, a polymer solution is obtained in a suitable solvent which must be transformed into textile fiber or carbon fiber precursor by means of a wet-spinning process. There are basically two technologies for carrying out this wet spinning industrially:

- wet spinning wherein the solution of polymer in the solvent ("dope") is fed to a spinneret immersed in a coagulation bath, composed of a mixture of solvent and non-solvent (generally water). At the outlet of the spinneret, the dope coagulates immediately upon contact with the coagulation bath, and then, through a series of washing operations (to remove the residual solvent) and stretching (for imparting the desired mechanical characteristics), it is transformed into the final fiber;
- dry jet wet spinning or Air-gap wet spinning, wherein the dope is fed to a spinneret suspended a few millimeters above the spinning bath. In this case, the strands of dope leaving the spinneret do not coagulate immediately upon contact with the bath, but pass for a small distance in the air, where a first stretching process (jet stretch) is effected before entering the bath where the coagulation takes place with the elimination of the solvent and formation of the fiber. Also in this case, the production process is completed by washing and stretching steps for obtaining the final fiber with the desired characteristics.

Both spinning technologies allow the production of fibers with excellent mechanical characteristics and suitable for the production of carbon fibers. Dry jet wet spinning is generally used when the precursor is destined for the production of high-performance carbon fibers, such as those used in the aerospace field. Wet spinning, on the contrary, is the preferred technology for the production of industrial fibers due to the lesser complexity and lower cost of the necessary machinery.

In addition to differences in the complexity of the spinning lines, there are also criteria for choosing the two technologies attributable to the size of the precursor tows to be produced and consequently to the size of the final carbon fibers. Also from this point of view, a rough distinction can be made by dry jet wet spinning more suitable for the production of small-tow carbon fibers, indicatively from 1K to 12K (the unit K corresponds to 1,000 filaments; 3K means that the yarn is composed of 3,000 primary filaments), whereas wet spinning is more suitable for the production of large-tow carbon fibers, indicatively 48-60K and over. A carbon fiber with a 24K count can be considered as being a fiber in which the choice of spinning technology between the two technologies described above must be evaluated on a case-by-case basis.

From a technical point of view, the substantial difference between the two spinning processes or technologies lies, as already mentioned, in the position of the spinneret, immersed inside or outside the coagulation bath. Furthermore, the spinneret itself differs mainly in the number of holes it can contain. Generally a wet-spinning spinneret has a number of holes equal to the number of strands forming the tow or bundle of precursor and therefore carbon fiber filaments, so that a 24K tow is obtained from a spinneret with 24,000 holes whereas a 48K tow is obtained from a spinneret with 48,000 holes.

In the case of dry jet wet spinning, on the other hand, the maximum number of holes that can be used on the spinneret generally ranges from 3,000 to 4,000 as a greater quantity of holes would involve the risk of the jets of liquid dope touching each other before coagulation, giving rise to glued threads with extremely heavy consequences both on the spinning of the precursor and on the quality of the carbon fiber. In this case, a 3K count is obtained using a single 3,000-hole spinneret, whereas a 6K count by combining two 3K tows, a 12K by combining 4 3K tows together and so forth.

The lower density of holes in air-gap spinnerets obviously entails a significant decrease in the production capacity of the line which is compensated by the use of a greater number of spinnerets (complexity of the machinery) and by a higher collection speed of the tows on the bobbins. The spinning speed in the case of wet spinning with organic solvents typically ranges from 60 to 100 m/min, whereas in the case of air-gap spinning, speeds ranging from 250 to 400 m/min can be obtained depending on the solvent used.

A further difference relates to the quality of the fiber produced which is generally better in the case of air-gap spinning in terms of compactness, absence of cracks and mechanical characteristics.

One of the main reasons that allow an advantage in terms of both speed and surface compactness is due to the jet stretch. This phenomenon, measured as the ratio between the speed at the outlet of the dope from the spinneret into the coagulation bath and the collection speed after coagulation, is typically less than or equal to 1 in the case of wet spinning, whereas it can vary from 1.5 to over 10 in the case of air gap due to the different coagulation moment.

Obtaining a jet stretch significantly greater than 1 also in wet spinning would allow some of the advantages associated with air-gap spinning to also be extended to this technology, while taking advantage of simpler and cheaper spinning equipment.

In the known art, various attempts have been made aimed at achieving these objectives which, however, have in no case been achieved as a whole.

EP 0372622 A2, for example, describes spinning conditions suitable for obtaining compact, crack-free fibers and with excellent mechanical characteristics. The spinning conditions described in this document provide for the use of spinnerets with a large diameter of the holes, ranging from 120 to 180 microns, preferably equal to 150 microns, the use of a coagulation bath rich in N,N-dimethylacetamide (DMAC), indicatively 80% by weight, at a temperature of 15-35° C., with a bobbin collection speed of 80 m/min, obtaining jet stretch values ranging from 1.5 to 5, preferably equal to 2.4.

Again with reference to the known art, in wet spinning in organic solvent for the production of carbon fiber precursor, the washing and stretching line generally consists of a series of containers (1, 1', 1'', 1''') with three/four rollers (2-2''', 3-3''', 4-4''', 5-5'''), preceded and/or followed by tanks (6, 6', 6'') (as shown in FIG. 1).

With the exception of the first and last container (1, 1'''), the first lower roller (2') is immersed in the tank (6) that precedes the container (1') and the second lower roller (5') is immersed in the tank (6') that follows the container (1').

The fresh washing solution is fed to the last tank (6''), from which the washed and stretched tows or bundles of filament exit. The tanks (6, 6', 6'') are advantageously fluidly connected to each other and the exhausted washing solution then exits from the first tank (6), into which the tows to be washed and stretched still soaked in solvent, enter.

In this way, a counter-current washing system is created which allows, with the same performance, the minimum quantity of washing liquid to be used, obtaining the exhausted solution with the greatest concentration of solvent.

When the tows in the tanks reach speeds higher than 100 m/min, however, the following drawbacks arise:

1. the washing solution or fluid trail entrained by the tows ("water drag") raises the level of the washing solution in the washing and washing and stretching tanks close to the end where the extraction rollers are situated, causing an overflow of the washing solution from the seals positioned between the walls of the tank and the immersed rollers;
2. due to the centrifugal effect, the immersed rollers generate violent sprays of washing solution, which are projected out of the tanks.

These drawbacks make the management of the spinning line complex, exposing the operators to splashes of hot fluids. The overflow of the same in the vicinity of the shaft of the roller 5', 5'' can then cause possible reciprocal pollution between the washing solution and the lubricants of the roller bearings.

The tanks can be washing tanks alone (the speed of the rollers 5 and 2' is the same) or they can be washing and stretching tanks when the speed of the roller 2' is greater than the speed of the roller 5.

When the speed of the fiber in the tanks where the washing and stretching takes place is much higher than 100 m/min, however, overflow and spray phenomena arise, as already described above.

The objective of the process and apparatus according to the present invention is therefore to overcome the drawbacks of the prior art previously indicated.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

DETAILED DESCRIPTION OF THE PREFERRED EMBODIMENT

Figure 1:
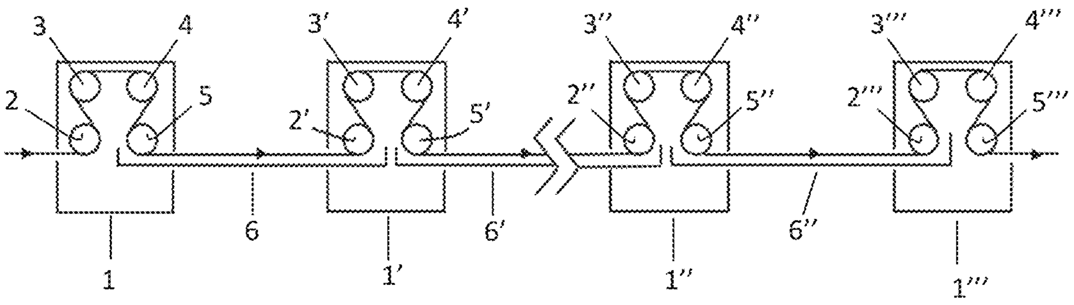
Fig. 1 (Prior Art)
FIG. 1 is a schematic view of the apparatus according to the state of the art.

The present invention therefore relates to a spinning process of a homogeneous solution of acrylic copolymer in organic solvent, preferably DMAC or DMSO, for the production of precursor fibers, said process comprising a wet-spinning step with a spinning speed ranging from 150 to 400 m/min, wherein the homogeneous solution of acrylic copolymer in organic solvent or dope is fed to one or more spinnerets with a hole diameter ranging from 150 to 300 microns, said spinnerets being immersed in a coagulation bath consisting of a mixture of organic solvent and non-solvent solvent with a concentration of organic solvent ranging from 78 to 85% by weight, preferably from 78 to 84% by weight, with respect to the total weight of the mixture, at a temperature ranging from 5 to 40° C.;

the dope at the outlet of said one or more spinnerets comes into contact with the coagulation bath where it coagulates forming a tow or bundle of filaments, with a jet stretch ranging from 5 to 15, said jet stretch being the ratio between the outlet speed of the dope from the spinneret into the coagulation bath and the collection speed after coagulation;

said tow or bundle of filaments then being fed to a series of washing or washing and stretching steps, wherein each washing or washing and stretching step is carried out in co-current, the movement direction of the washing solution coinciding with the movement direction of the tow or bundle of filaments, the feeding and discharging of the washing solution in each washing or washing and stretching step being carried out in countercurrent with respect to the movement direction of the tow or bundle of filaments.

The non-solvent solvent of the coagulation bath is preferably water.

The washing solution is preferably water.

The organic solvent of the homogeneous acrylic copolymer solution is the same organic solvent used in the coagulation bath, preferably the organic solvent is dimethylacetamide (DMAC) or dimethyl sulfoxide (DMSO).

The coagulation bath preferably consists of a water/dimethylacetamide mixture or a water/dimethylsulfoxide mixture.

When the coagulation bath consists of the water/dimethylsulfoxide mixture, the temperature of the bath is preferably in the range of from 5 to 15° C.

The acrylic polymer is a copolymer of acrylonitrile with one or more monomers selected from the group comprising methyl acrylate, methyl methylacrylate, vinyl acetate, acrylamide, acrylic acid, itaconic acid or sulfonated styrenes, wherein the acrylonitrile is present in a quantity ranging from 90 to 99% by weight and the comonomer in a quantity ranging from 1 to 10% by weight with respect to the total weight of the polymer.

The process according to the present invention allows a precursor fiber to be obtained with excellent mechanical characteristics and surface compactness, the absence of cracks, the mechanical characteristics being similar to those obtained by air-gap spinning.

A further advantage of the process according to the present invention is the possibility of reaching spinning speeds (150-400 m/min) similar to those obtained with the air-gap process.

As already mentioned, spinning speed refers to the collection speed of the fiber on the bobbin, whereas jet stretch refers to the ratio between the exiting speed of the dope from the spinneret into the coagulation bath and the collection speed after coagulation.

The objective of the present invention is to also define a spinning apparatus capable of allowing the implementation of the process described above.

The present invention therefore further relates to an apparatus for wet spinning, characterized in that it comprises at least one washing or washing and stretching unit U, said unit U comprising:

- a washing tank (6) suitable for containing a washing solution (8);
  - wherein said solution (8) is suitable for being fed to a first end of said tank (6) at a first temperature T1 and wherein said solution (8) is suitable for being discharged at a second end of said tank (6) at a second temperature T2, said temperature T1 being higher than said temperature T2;
    - mechanical means, preferably rollers (5, 2'), suitable for moving a tow or bundle of filaments (7), from said first end to said second end of the tank (6);
    - wherein in the washing tank (6), the movement direction of the washing solution (8) is in co-current with respect to the movement direction of the tow or bundle of filaments (7).

Said washing or washing and stretching unit U is preferably characterized in that the solution (8) suitable for being discharged at the second end of said washing tank (6) at the second temperature T2, is fed through an overflow (11) and a filter (12) to an auxiliary recycling tank (9) where a first portion of said solution (8) is fed by means of a pump (13) to an auxiliary heating tank (10), equipped with a heat exchanger (14), said auxiliary heating tank (10) being suitable for feeding said washing solution (8) to the first end of said washing tank (6) at the first temperature T1.

The wet-spinning apparatus according to the present invention preferably comprises two or more washing or washing and stretching units (U), arranged in sequence and fluidly connected to each other.

The auxiliary recycling tank (9) of each washing or washing and stretching unit U is suitable for being fed with the remaining portion of the washing solution (8) coming from the auxiliary recycling tank (9') of the washing or washing and stretching unit U arranged downstream of said washing tank (6) with respect to the movement of the tow or bundle of filaments (7), said auxiliary recycling tank (9) also being suitable for feeding the remaining portion of washing solution (8) extracted at the second end of said washing tank (6) at the second temperature T2, to the auxiliary recycling tank of the washing or washing and stretching unit U arranged upstream of said washing tank (6) with respect to the movement of the tow or bundle of filaments (7).

The apparatus for wet spinning comprising two or more washing or washing and stretching units U, is therefore characterized in that, with reference to the sequential arrangement of the washing or washing and stretching units U, the feeding of the washing solution is countercurrent with respect to the movement direction of the tow or bundle of filaments.

The apparatus according to the present invention allows the potential of the new spinning process to be fully exploited in terms of speed, which could not be achieved in devices according to the state of the art for wet spinning in organic solvent which do not allow smooth running at speeds higher than 100 m/min for fluid-dynamic reasons.

Figure 2:
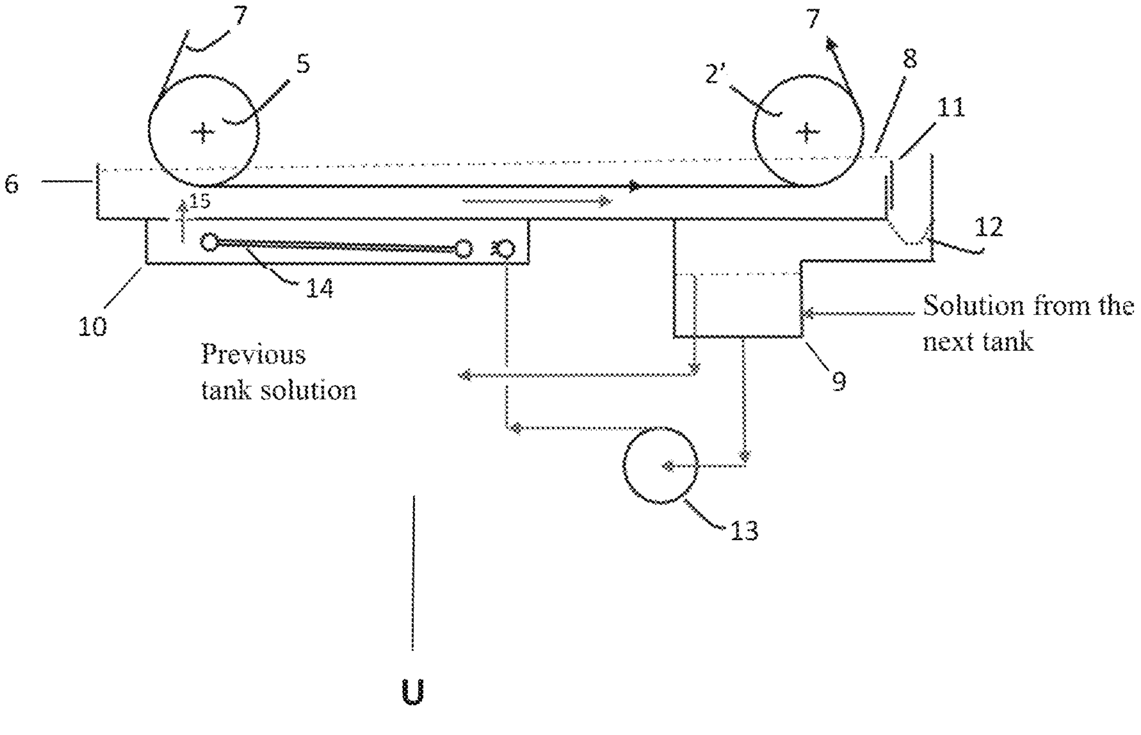
FIG. 2 is a schematic view of an apparatus according to the present invention.

In the attached FIGS. 1 and 2, FIG. 1, as already mentioned, is representative of an apparatus according to the state of the art, whereas FIG. 2 is representative of an apparatus according to the present invention.

In the present description, for the illustration of the figures, identical reference numbers or letters are used for indicating construction elements with the same function. Furthermore, for clarity of illustration, some references may not have been repeated in all of the figures.

The apparatus according to the present invention is represented in the diagram of the attached FIG. 2, wherein the tows (7), coming from the roller container positioned at the inlet, leave the roller (5) and proceed towards the roller (2') immersed in the solution contained in the tank (6). The roller (2') extracts the tows from the washing solution (8) and accompanies them to the following rollers (3', 4' and 5', not shown in FIG. 2), which feed the next tank (6', not shown in the figure).

The tank 6 is equipped with auxiliary tanks (9, 10). The washing solution is collected in the auxiliary tank (9) or recycling tank and exits from the tank (6) through an overflow (11), filtered through the filter (12), which can be removed for cleaning. A pump (13) takes the filtered washing solution from the auxiliary tank (9) or recycling tank and feeds it to the auxiliary tank (10) or heating tank, in which a heat exchanger (14) is generally installed, powered with steam.

The washing solution, filtered and heated, returns to the main tank (6) through special distribution slots (15) and flows inside the same in co-current with respect to the movement direction of the tows.

As indicated above, therefore, the flow of the washing solution and of the tow or bundle of filaments is in co-current inside the tank of each washing unit, whereas, considering the series of different washing units present in the spinning line, the overall configuration is in countercurrent, an arrangement that allows a better efficiency of the overall washing process.

The configuration of the apparatus according to the present invention is characterized by the following advantages:

1. it allows the rise in the level of the washing solution near the second end or outlet of the tank (6) to be compensated, by acting on the adjustable overflow (11) in order to avoid overflows and leaks through the seals of the rollers;
2. it allows the liquid trail of the washing solution that accompanies the tows (7) to proceed towards the overflow (11) at the outlet without reversing the direction, causing a lower level of the washing solution;
3. it reduces the amount of splashes of washing solution released by the roller (2') due to a lower immersion of the roller itself, with a more horizontal starting angle of the splashes The tows or bundles of filament exiting from the washing and stretching phases are then rinsed with jets of demineralized water and squeezed by pressure rollers.

EXAMPLES

By way of non-limiting example of the present invention, some embodiment examples of the process according to the present invention and some comparative examples are provided hereunder.

Example 1

100 kg/h of acrylonitrile, 1 kg/h of methyl acrylate, 2 kg/h of itaconic acid dissolved in 5% by weight of water; 0.4 kg/h of ammonium persulfate dissolved in water, 0.5 kg/h of ammonium bisulfite dissolved in water, 2 g/h of iron sulfate dissolved in water and 250 kg/h of water containing sulfuric acid sufficient for keeping the reaction pH at a value ranging from 2.0 to 3.5, were added in continuous at a temperature of 62° C. to an aluminum reactor equipped with stirrer and overflow. The ingredients were fed at such a flow-rate as to allow a residence time of 90 minutes. The reaction was stopped after 90 minutes by adding an aqueous solution of EDTA in the overflow and the slurry was fed to a stripping column where unreacted acrylonitrile and methyl acrylate were removed, obtaining a polymer slurry in water at the bottom. The polymer was filtered, washed, dried and subsequently dissolved in DMAC. The solution thus obtained, containing 20% by weight of polymer was filtered by means of a battery of filter presses with selectivity cloths progressively varying from 40 μm to 5 μm and fed to a wet-spinning line with 12,000-hole spinnerets, having a capillary diameter equal to 250 microns.

The spinning solution, kept at a temperature of 80° C., was fed to the spinneret immersed in a coagulation bath by means of a 50 cc/rev spinning pump, i.e. at each revolution the pump doses 50 cc. The coagulation bath is composed of a mixture of water and DMAC containing 82% by weight of DMAC at a temperature of 20° C. The bundle of nascent fibers was subsequently passed into a post-coagulation bath, consisting of a mixture of water and DMAC containing 32% by weight of DMAC at a temperature of 40° C.

The speed of the first collection roller was equal to 26.42 m/min, corresponding to a jet stretch of 8.9.

The bundle of fibers was subsequently fed to a series of washing and stretching steps. The total stretching, divided into three steps, was equal to 10.06×, i.e. the initial length increased by 10.06 times. The washing operations were carried out using the tanks as shown in FIG. 2.

The tow thus produced was finally collected on bobbins at a speed of 250.7 m/min.

At the end of the spinning process, 12 K precursor bobbins were obtained with the following characteristics:

Titer: 1.1 dtex;
Breaking strength: 68.1 cN/tex;
Ultimate elongation: 15.2%
suitable for the production of carbon fiber.

Example 2

A spinning solution in DMAC prepared as described in Example 1, was fed to a wet-spinning line with 24,000-hole spinnerets having a capillary diameter of 300 microns.

The spinning solution maintained at a temperature of 80° C. was fed to the spinneret immersed in a coagulation bath by means of a 100 cc/rev spinning pump. The coagulation bath is composed of a mixture of water and DMAC containing 82% by weight of DMAC, at a temperature of 20° C. The bundle of nascent fibers was subsequently passed into a post-coagulation bath consisting of a mixture of water and DMAC containing 33% by weight of DMAC at a temperature of 40° C.

The speed of the first collection roller after the coagulation bath was equal to 31.6 m/min, corresponding to a jet stretch of 12.8.

The bundle of fibers was subsequently fed to a series of stretching and washing steps. The total stretching, divided into three steps, was equal to 10.06×. The washing operations were carried out using the tanks as shown in FIG. 2.

The tow thus produced was finally collected on bobbins at a speed of 300.1 m/min.

At the end of the spinning process, 24 K precursor bobbins were obtained with the following characteristics:

Titer 1.1 dtex;
Breaking strength: 66.8 cN/tex;
Ultimate elongation: 14.9%
suitable for the production of carbon fiber.

Example 3

A spinning solution prepared as described in Example 1, using DMSO instead of DMAC as solvent and a polymer concentration in the solution of 19% by weight, was fed to a wet-spinning line with 12,000-hole spinnerets having a capillary diameter of 250 microns.

The spinning solution maintained at a temperature of 80° C. was fed to the spinneret immersed in a coagulation bath by means of a 50 cc/rev spinning pump. The coagulation bath is composed of a mixture of water and DMSO containing 81% by weight of DMSO, at a temperature of 5° C. The bundle of nascent fibers was subsequently passed into a post-coagulation bath consisting of a mixture of water and DMSO containing 31% by weight of DMSO at a temperature of 35° C.

The speed of the first collection roller after the coagulation bath was equal to 31.7 m/min, corresponding to a jet stretch of 8.6.

The bundle of fibers was subsequently fed to a series of stretching and washing steps. The total stretching, divided into three steps, was equal to 10.06×. The washing operations were carried out using the tanks as shown in FIG. 2.

The tow thus produced was finally collected on bobbins at a speed of 300.8 m/min.

At the end of the spinning process, 12 K precursor bobbins were obtained with the following characteristics:

Titer: 1.25 dtex;

Breaking strength: 70.1 cN/tex;

Ultimate elongation: 14.2% suitable for the production of carbon fiber.

Example 4

A spinning solution prepared as described in Example 1, using DMSO instead of DMAC as solvent and a polymer concentration in the solution of 19% by weight, was fed to a wet-spinning line with 24,000-hole spinnerets having a capillary diameter of 300 microns.

The spinning solution, maintained at a temperature of 80° C., was fed to the spinneret immersed in a coagulation bath by means of a 100 cc/rev spinning pump. The coagulation bath is composed of a mixture of water and DMSO containing 81% by weight of DMSO at a temperature of 5° C. The bundle of nascent fibers was subsequently passed through a post-coagulation bath consisting of a mixture of water and DMSO containing 32% by weight of DMSO at a temperature of 35° C.

The speed of the first collection roller after the coagulation bath was equal to 31.6 m/min, corresponding to a jet stretch of 12.5.

The bundle of fibers was subsequently fed to a series of stretching and washing steps. The total stretching, divided into three steps, was equal to 10.06×. The washing operations were carried out using the modified tanks as shown in FIG. 2. The tow thus produced was finally collected on bobbins at a speed of 300.2 m/min.

At the end of the spinning process, 24 K precursor bobbins were obtained with the following characteristics:

Titer: 1.24 dtex;

Breaking strength: 71.2 cN/tex;

Ultimate elongation: 14.0% suitable for the production of carbon fiber.

Example 5 Comparative

A spinning solution prepared as described in example 3, maintained at a temperature of 80° C., was fed to the spinneret having a capillary diameter of 250 microns immersed in a coagulation bath by means of a 50 cc/rev spinning pump. The coagulation bath is composed of a mixture of water and DMSO containing 75% by weight of DMSO at a temperature of 5° C. The bundle of nascent fibers was subsequently passed through a post-coagulation bath consisting of a mixture of water and DMSO containing 32% by weight of DMSO at a temperature of 35° C.

The speed of the first collection roller after the coagulation bath was equal to 31.6 m/min, corresponding to a jet stretch of 8.5. Under these conditions the spinning was impossible due to frequent breakages of the bundle of nascent fibers in the coagulation bath.

Example 6 Comparative

A spinning solution prepared as described in example 3, maintained at a temperature of 80° C., was fed to the spinneret having a capillary diameter of 250 microns immersed in a coagulation bath by means of a 50 cc/rev spinning pump. The coagulation bath is composed of a mixture of water and DMSO containing 86% by weight of DMSO at a temperature of 20° C. Under these conditions it was not possible collecting a bundle of fibers because the nascent fibers are dissolved in the coagulation bath immediately after exiting the spinnerets.

The speed of the first collection roller after the coagulation bath was equal to 31.6 m/min, corresponding to a jet stretch of 8.5. Under these conditions the spinning was impossible due to frequent breakages of the bundle of nascent fibers in the coagulation bath.

The invention claimed is:

1. A method of spinning a homogeneous solution of acrylic copolymer in organic solvent for the production of precursor fibers including a wet-spinning step comprising spinning homogeneous solution at a speed ranging from 150 to 400 m/min, wherein the homogeneous solution of acrylic copolymer in organic solvent or dope is fed to one or more spinnerets with a hole diameter ranging from 150 to 300 microns, said spinnerets being immersed in a coagulation bath consisting of a mixture of organic solvent and non-solvent solvent with a concentration of organic solvent ranging from 78 to 85% by weight, with respect to the total weight of the mixture, at a temperature ranging from 5 to 40° C.;

the dope at the outlet of said one or more spinnerets comes into contact with the coagulation bath where it coagulates forming a tow or bundle of filaments, with a jet stretch ranging from 5 to 15, said jet stretch being the ratio between the outlet speed of the dope from the spinneret into the coagulation bath and the collection speed after coagulation;

said tow or bundle of filaments then being fed to a series of washing or washing and stretching steps, wherein each washing or washing and stretching step is carried out in co-current, a movement direction of a washing solution coinciding with a movement direction of the tow or bundle of filaments, a feeding and discharging of the washing solution in each washing or washing and stretching step being carried out in countercurrent with respect to the movement direction of the tow or bundle of filaments.

2. The method according to claim 1, wherein the non-solvent solvent of the coagulation bath is water.

3. The method according to claim 1, wherein the washing solution is water.

4. The method according to claim 1, wherein the organic solvent of the homogeneous solution of acrylic copolymer is the same organic solvent used in the coagulation bath.

5. The method according to claim 1, wherein the coagulation bath consists of a water/dimethylacetamide mixture or a water/dimethylsulfoxide mixture.

6. The method according to claim 1, wherein the coagulation bath consists of a water/dimethylsulfoxide mixture and the temperature of the bath is in the range of from 5 to 15° C.

7. The method according to claim 1, wherein the acrylic polymer is a copolymer of acrylonitrile with one or more monomers selected from the group consisting of methyl acrylate, methyl methylacrylate, vinyl acetate, acrylamide, acrylic acid, itaconic acid and sulfonated styrenes, wherein the acrylonitrile is present in a quantity ranging from 90 to 99% by weight and the comonomer in a quantity ranging from 1 to 10% by weight with respect to the total weight of the polymer.

8. A wet-spinning apparatus, comprising at least one washing or washing and stretching unit U, said unit U comprising:

a washing tank configured for containing a washing solution;

wherein said solution is fed to a first end of said tank at a first temperature T1 and wherein said solution is discharged at a second end of said tank at a second temperature T2, said temperature T1 being higher than said temperature T2;

mechanical means configured for moving a tow or bundle of filaments from said first end to said second end of the tank;

wherein in the washing tank, the movement direction of the washing solution is in co-current with respect to the movement direction of the tow or bundle of filaments; and further wherein the solution being discharged at the second end of said washing tank at the second temperature T2, is fed through an overflow and a filter to an auxiliary recycling tank where a first portion of said solution is fed by means of a pump to an auxiliary heating tank, equipped with a heat exchanger, said auxiliary heating tank being configured for feeding said washing solution to the first end of said washing tank at the first temperature T1.

9. The apparatus according to claim 8, wherein said apparatus comprises two or more washing or washing and stretching units (U), arranged in sequence and fluidly connected to each other.

10. The apparatus according to claim 9, wherein an auxiliary recycling tank of each washing or washing and stretching unit U is configured for being fed with a remaining portion of the washing solution coming from an auxiliary recycling tank of the washing or washing and stretching unit U arranged downstream of said washing tank with respect to the movement of the tow or bundle of filaments, said auxiliary recycling tank also being configured for feeding a remaining portion of washing solution extracted at the second end of said washing tank at the second temperature T2, to the auxiliary recycling tank of the washing or washing and stretching unit U arranged upstream of said washing tank with respect to the movement of the tow or bundle of filaments.

11. The apparatus according to claim 9, wherein the feeding of the washing solution is in countercurrent with respect to the movement direction of the tow or bundle of filaments with respect to the sequential arrangement of the washing or washing and stretching units U.

12. The method according to claim 1 wherein the coagulation bath consisting of a mixture of organic solvent and non-solvent solvent has a concentration of organic solvent ranging from 78 to 84% by weight, with respect to the total weight of the mixture.

13. The method according to claim 1, wherein the organic solvent of the homogeneous solution of acrylic copolymer and the organic solvent used in the coagulation bath is taken from the group consisting of dimethylacetamide (DMAC) and dimethyl sulfoxide (DMSO).

14. The apparatus according to claim 8, wherein the mechanical means comprises rollers.

15. A wet-spinning apparatus, comprising two or more washing or washing and stretching units U, arranged in sequence and fluidly connected to each other, said apparatus comprising:

a washing tank configured for containing a washing solution;

wherein said solution is fed to a first end of said tank at a first temperature T1 and wherein said solution is discharged at a second end of said tank at a second temperature T2, said temperature T1 being higher than said temperature T2;

mechanical means configured for moving a tow or bundle of filaments from said first end to said second end of the tank;

wherein in the washing tank, the movement direction of the washing solution is in co-current with respect to the movement direction of the tow or bundle of filaments; and further wherein the feeding of the washing solution is in countercurrent with respect to the movement direction of the tow or bundle of filaments with respect to the sequential arrangement of the washing or washing and stretching units U.

16. The apparatus according to claim 15, wherein an auxiliary recycling tank of each washing or washing and stretching unit U is configured for being fed with a remaining portion of the washing solution coming from an auxiliary recycling tank of the washing or washing and stretching unit U arranged downstream of said washing tank with respect to the movement of the tow or bundle of filaments, said auxiliary recycling tank also being configured for feeding a remaining portion of washing solution extracted at the second end of said washing tank at the second temperature T2, to the auxiliary recycling tank of the washing or washing and stretching unit U arranged upstream of said washing tank with respect to the movement of the tow or bundle of filaments.

17. The apparatus according to claim 15, wherein the mechanical means comprises rollers.

* * * * *